US007801652B2

(12) United States Patent
Regnard de Lagny et al.

(10) Patent No.: US 7,801,652 B2
(45) Date of Patent: Sep. 21, 2010

(54) METHOD FOR STORING DATA CONCERNING AN OPERATING FAULT OF A DEVICE

(75) Inventors: Joseph Regnard de Lagny, La Norville (FR); Abdelmalik Belaid, Paris (FR)

(73) Assignee: Renault S.A.S, Boulogne (FR)

( * ) Notice: Subject to any disclaimer, the term of this patent is extended or adjusted under 35 U.S.C. 154(b) by 16 days.

(21) Appl. No.: 12/097,270

(22) PCT Filed: Nov. 29, 2006

(86) PCT No.: PCT/FR2006/051252

§ 371 (c)(1), (2), (4) Date: Aug. 6, 2008

(87) PCT Pub. No.: WO2007/068836

PCT Pub. Date: Jun. 21, 2007

(65) Prior Publication Data

US 2008/0312787 A1 Dec. 18, 2008

(30) Foreign Application Priority Data

Dec. 14, 2005 (FR) .................................. 05 12640

(51) Int. Cl.
*G01M 17/00* (2006.01)

(52) U.S. Cl. ............................ 701/35; 701/29; 702/33; 702/35; 702/127; 700/28

(58) Field of Classification Search .................. 701/35, 701/114, 109, 29; 702/127, 33–35; 340/511; 700/28–29
See application file for complete search history.

(56) References Cited

U.S. PATENT DOCUMENTS 4,414,539 A * 11/1983 Armer ........................ 340/500

(Continued)

FOREIGN PATENT DOCUMENTS

DE 10015319 A1 * 11/2000

(Continued)

OTHER PUBLICATIONS

Industrial Mechatronics and Automation, 2009. ICIMA 2009. International Conference on; Digital Object Identifier: 10.1109/ICIMA.2009.5156539; Publication Year: 2009 , pp. c1-c1.*

(Continued)

*Primary Examiner*—Cuong Nguyen
(74) *Attorney, Agent, or Firm*—Oblon, Spivak, McClelland, Maier & Neustadt, L.L.P.

(57) ABSTRACT

A method for storing data concerning an operating fault of a device, wherein the recorded data include in particular a minimum value and a maximum value of a characteristic parameter of the operating mode of the device. The method includes an updating phase, performed when the fault occurs, which includes an operation that updates the minimum value and/or the maximum value based on the current value of the parameter. The updating phase may also include updating an occurrence number. The method may also include an initializing phase, during which a reference image of the parameters of the device is stored. The method is applicable in particular to the diagnosis of a vehicle engine-transmission unit.

10 Claims, 1 Drawing Sheet

U.S. PATENT DOCUMENTS

| | | | | |
|---|---|---|---|---|
| 4,458,319 | A * | 7/1984 | Chujo et al. | 701/109 |
| 6,333,932 | B1 * | 12/2001 | Kobayasi et al. | 370/389 |
| 6,677,854 | B2 * | 1/2004 | Dix | 340/438 |
| 7,218,974 | B2 * | 5/2007 | Rumi et al. | 700/28 |
| 7,350,175 | B2 * | 3/2008 | Iwaki et al. | 716/11 |
| 7,551,612 | B2 * | 6/2009 | Kobayashi et al. | 370/368 |
| 2002/0059040 | A1 * | 5/2002 | Jones et al. | 702/120 |
| 2003/0051185 | A1 * | 3/2003 | Garnett et al. | 714/1 |
| 2003/0095038 | A1 * | 5/2003 | Dix | 340/425.5 |
| 2003/0144806 | A1 * | 7/2003 | Jones | 702/82 |
| 2003/0179712 | A1 * | 9/2003 | Kobayashi et al. | 370/249 |
| 2004/0002810 | A1 * | 1/2004 | Akuzawa et al. | 701/114 |
| 2006/0224254 | A1 * | 10/2006 | Rumi et al. | 700/28 |
| 2008/0312787 | A1 * | 12/2008 | Regnard De Lagny et al. | 701/35 |

FOREIGN PATENT DOCUMENTS

| | | | |
|---|---|---|---|
| EP | 1345182 | A * | 9/2003 |
| JP | EP 1118965 | A1 * | 7/2001 |
| JP | 2003132481 | A * | 5/2003 |
| JP | 2009124816 | A * | 6/2009 |
| WO | WO 9715468 | A2 * | 5/1997 |

OTHER PUBLICATIONS

Robust Model-Based Fault Detection for a Roll Stability Control System; Li Xu; Tseng, H.E.; Control Systems Technology, IEEE Transactions on; vol. 15 , Issue: 3; Digital Object Identifier: 10.1109/TCST.2006.890287; Publication Year: 2007 , pp. 519-528.*

Systematic Data-Driven Approach to Real-Time Fault Detection and Diagnosis in Automotive Engines; Namburu, S.M. et al.; Autotestcon, 2006 IEEE; Digital Object Identifier: 10.1109/AUTEST.2006.283654; Publication Year: 2006 , pp. 59-65.*

Fault Tolerant Operations in Adjustable-Speed Drives and Soft Starters for Induction Motors; Chia-Chou Yeh et al.;Power Electronics Specialists Conference, 2007. PESC 2007. IEEE; Digital Object Identifier: 10.1109/PESC.2007.4342301 Publication Year: 2007 , pp. 1942-1949.*

Cooperative federated filtering approach for enhanced position estimation and sensor fault tolerance in ad-hoc vehicle networks Edelmayer, A. et al.; Intelligent Transport Systems, IET; vol. 4 , Issue: 1; Digital Object Identifier: 10.1049/iet-its.2009.0017 Publication Year: 2010 , pp. 82-92.*

Research on Vehicle Traveling Data Recorder; Hongjiang He et al.; Intelligent Computation Technology and Automation, 2009. ICICTA '09. Second International Conference on; vol. 3; Digital Object Identifier: 10.1109/ICICTA.2009.643; Publication Year: 2009 , pp. 736-738.*

Performance analysis of an electric vehicle in faulty inverter mode; Zadeh, M.S. et al.; Power and Energy Conference, 2008. PECon 2008. IEEE 2nd International; Digital Object Identifier: 10.1109/PECON.2008.4762571; Publication Year: 2008 , pp. 731-736.*

Robust Model-Based Fault Detection for a Roll Stability Control System; Li Xu et al.; Control Systems Technology, IEEE Transactions on; vol. 15 , Issue: 3; Digital Object Identifier: 10.1109/TCST.2006.890287; Publication Year: 2007 , pp. 519-528.*

Managing and Predicting Intermittent Failures Within Long Life Electronics; Line, J.K. et al.; Aerospace Conference, 2008 IEEE Digital Object Identifier: 10.1109/AERO.2008.4526629; Publication Year: 2008 , pp. 1-6.*

Automatic Fault Isolation by Cultural Algorithms With Differential Influence; Arpaia, P. et al.; Instrumentation and Measurement, IEEE Transactions on; vol. 56 , Issue: 5; Digital Object Identifier: 10.1109/TIM.2007.903604; Publication Year: 2007 , pp. 1573-1582.*

* cited by examiner

METHOD FOR STORING DATA CONCERNING AN OPERATING FAULT OF A DEVICE

BACKGROUND OF THE INVENTION

1. Field of the Invention

The invention relates to a method of recording information concerning a device operating fault. The invention is particularly applicable in diagnosing a failure of a device in a motor vehicle (for example a drive train of the vehicle), in order to facilitate the repair of the failed device.

2. Description of the Related Art

Modern motor vehicles use on-board computers to control numerous electrical or mechanical devices, such as, for example, to control an injection system of the engine, to control an automatic or robotized gearbox, and so on.

To guarantee both safety of the user regarding a possible failure of a device or of a component of a control system and the repair of the failed device by a repairer, these computers also incorporate means for implementing various electrical or functional diagnostic methods.

When a failure of a device is diagnosed for the first time, the computer records in a nonvolatile memory information relating to the observed fault; this information notably comprises a code associated with the observed fault, and possibly values of parameters characteristic of the operation of the device, also called context data. The context data can be generic, that is, identical for all the observed faults, or even specific to a particular fault; they can in this case be different for different faults. For example, in the case of a fault associated with a speed control, the speed set point and the value of the speed measured on detection of the fault are recorded. In all cases, the recorded information is used to help the subsequent repairer by providing him with additional information on the conditions in which the fault was detected.

In some current recording methods, the context data is stored only on the first occurrence of the fault. It is therefore impossible to know whether the stored conditions truly correspond to particular conditions where the fault regularly occurs, or simply to the "any" conditions prevailing on the chance occurrence of the fault. As an example, for an electrical fault where the engine speed stored on the first occurrence of the fault is 2500 rpm, there is nothing to tell the repairer whether it is an ongoing fault occurring for the first time at the speed of 2500 rpm, or an intermittent fault occurring only at a speed approaching 2500 rpm, and which would be due, for example, to a resonance effect.

This solution is not satisfactory, because the information stored is often insufficient to allow a rapid repair, particularly in the case of intermittent faults (for example electrical faults due to bad contacts) and/or in the case of complex faults (for example operating faults occurring in precise and restricted conditions).

In other current recording methods, the context data is recorded on each occurrence of the fault that it characterizes, which facilitates the diagnostic procedure.

This solution is, however, extremely costly in terms of nonvolatile memory. In practice, if the context data stored on detection of a fault represents a size of n bytes, the occurrence m times of this fault will therefore lead to the use of n*m bytes of memory. The richness of the transmitted information is therefore rapidly limited by the size of the memory.

SUMMARY OF THE INVENTION

The aim of the invention is to propose a new method of recording information relating to a fault, which does not have the drawbacks of the known methods. More specifically, the aim of the invention is to propose a new recording method, which makes it possible to provide exhaustive information for a future diagnosis of the fault, while limiting the overall volume of information recorded.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
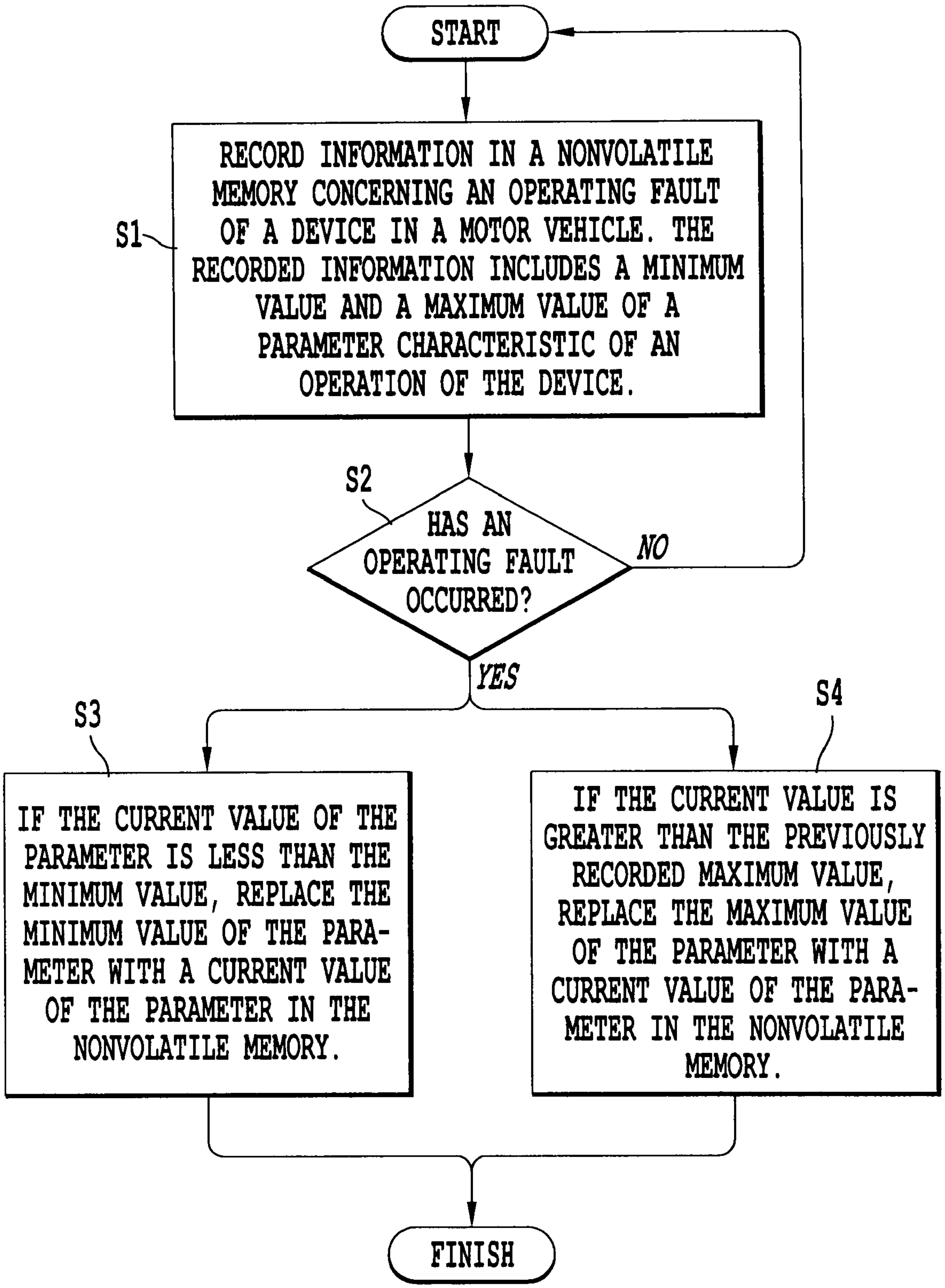
FIG. 1 is a flow chart depicting a recording method in accordance with an embodiment of the present invention.

This aim is achieved with a method according to the invention of recording a device operating fault, characterized in that the stored information notably comprises a minimum value and a maximum value of a parameter characteristic of the device (see Step S1 of FIG. 1), and in that the method comprises an update phase which is performed on an occurrence of the fault (see Step S2 in FIG. 1) and which comprises the following step E11 consisting in:

E11:

As shown in Step S3 of FIG. 1, replacing the minimum value of the parameter with the current value of the parameter if the current value of the parameter is less than the minimum value, or As shown in Step S4 of FIG. 1, replacing the maximum value of said parameter with the current value of the parameter if the current value is greater than the previously recorded maximum value.

The update phase can also comprise the following step E12, performed on the occurrence of the fault and consisting in:

E12: repeating the step E11 for each parameter characteristic of the device in operation.

The method thus makes it possible to record minimum and maximum values for several parameters characteristic of the device.

The update phase can also comprise the following step E13, performed on the occurrence of the fault and consisting in:

E13: incrementing a number of occurrences of the fault.

Thus, it is possible to know precisely how many times the fault has occurred.

The update phase is repeated on each occurrence of the fault.

According to a preferred embodiment, the method according to the invention also comprises an initialization phase, performed on a first occurrence of the fault and comprising one or more of the following steps, consisting in:

E01: initializing a reference value of the parameter with the current value of the parameter, E02: initializing the minimum value of the parameter and the maximum value of the parameter with the current value of the parameter, E03: repeating the step E01 and/or the step E02 for each parameter characteristic of the device in operation, E04: initializing the number of occurrences.

The initialization phase thus makes it possible on the one hand to record a precise "image" of an occurrence of the fault, and on the other hand to initialize the minimum and maximum values of each parameter and the number of occurrences of the fault.

The method according to the invention is notably of interest for the recording of information concerning an operating fault of a device such as a drive train in a vehicle.

The invention is notably of interest for the diagnosing of intermittent faults, that is, faults that do not last, but which occur several times over time.

The method according to the invention will be described below in the context of a nonlimiting example, in which the method in its most complete and most efficient version is implemented to diagnose the operation of a regulation device used to regulate the speed of a motor vehicle about a set point speed.

In the example, a fault is detected when, in the absence of intervention from the driver of the vehicle, the speed is always different from the set point speed after a time T. The detection of the fault is handled by a comparator which compares the speed measured by a sensor to the set point speed imposed by the driver.

In the example, the parameters of the regulation device considered to be relevant to the identification and repair of the fault are the temperature in the housing of the regulation device (the electronic components of the device do not operate or operate badly outside of a usual operating range) and the speed of the vehicle (the regulation loop has little or no effectiveness outside of a specified speed range).

The method according to the invention is initialized on the first occurrence of the fault. In the initialization phase of the method, the following steps are carried out, consisting in:

E01: initializing a reference value of the parameter with the current value of the parameter, E02: initializing the minimum value of the parameter and the maximum value of the parameter with the current value of the parameter, E03: repeating the step E01 and/or the step E02 for each parameter characteristic of the device in operation, E04: initializing the number of occurrences.

In the example, in the steps E01 and E03, the current value of the temperature of the housing and the speed of the engine are recorded as reference values: these reference values define a precise image of the device at the moment when the fault occurs, an image that will be retained throughout the method.

In the steps E02 and E03, the minimum value and the maximum value of the temperature are initialized with the current temperature, and the minimum value and the maximum value of the speed are initialized with the current speed value. Initial minimum/maximum values of the parameters are thus available, which will be updated subsequently.

In the step E04, a number of occurrences is initialized at 1. Preferably, this number is initialized at 1 when the fault disappears, in the example when the comparator detects that the speed is sufficiently close to the set point speed, to within 1% for example. The initialization of the number of occurrences means that there has been a fault, which has disappeared. Remember that the purpose of the inventive method is to store the conditions of occurrence of a fault that is intermittent, that is, one that is not permanent but which is repeated.

Then, on a subsequent new occurrence of the fault, an update phase is performed, comprising the following steps, consisting in:

E11: replacing the minimum value of the parameter with the current value of the parameter if the current value of the parameter is less than the minimum value, and/or replacing the maximum value of said parameter with the current value of the parameter if the current value is greater than the previously recorded maximum value.

E12: repeating the step E11 for each parameter characteristic of the device in operation.

E13: incrementing a number of occurrences of the fault.

In the example, in the step E11, the minimum and maximum values recorded for the temperature of the housing are updated, if necessary, that is, if the current value of the temperature is less than the minimum value or greater than the maximum value previously recorded. In the step E12, the minimum and maximum values recorded for the engine speed are updated, if necessary, that is, if the current speed value is less than the minimum value or greater than the maximum value previously recorded.

In the step E13, the number of occurrences is incremented by one. Preferably, this number is initialized at one when the fault disappears, for the same reasons as previously.

The update phase is then repeated as many times as necessary, on each new occurrence of the fault.

Later, a repairer seeking to diagnose and repair the fault will consult the nonvolatile memory before erasing its content.

The invention was developed for a control device of the drive train of a motor vehicle, but it can very easily be extended to any electronic computer provided with means of detecting a device operating fault and means of recording information relating to the occurrence of the detected fault. In a vehicle, the monitored device can also, for example, be a control device of a braking system, a speed regulation device, a temperature regulation device, and so on.

The method according to the invention has all the advantages of the prior solutions without their drawbacks.

Thus, with the method according to the invention, each fault has an associated set of context data, also naturally comprising the corresponding fault code:

an indication of the number of occurrences of the fault, that is, of the number of times when the detector has detected the presence of the fault since the last time the computer's nonvolatile memory was erased;

for each parameter characteristic of the fault, a reference value corresponding to a particular occurrence of the fault; in the example described, the first occurrence of the fault (step E04), for each parameter characteristic of the fault, a minimum value and a maximum value of said parameter; these two values define a range of values of the parameter in which the fault has occurred.

Thus, the repairer knows precisely, for each recorded fault, the operating zone in which this fault occurs, and is therefore more able:

to analyze the possible causes of the fault. For example, if an electrical fault occurs between 2000 and 2500 rpm, it is very probably an intermittent fault (poor contact of a connector) associated with a resonance frequency, to validate the appropriateness and the quality of his repair, by the reproduction, in a test (static or dynamic) of these particular conditions and by checking that the fault does not reoccur.

Compared to the prior solution consisting in recording only the values of the parameters of the fault on a particular occurrence of the fault, the implementation of the method according to the invention multiplies by three the capacity of the area of the nonvolatile memory of the computer allocated to store fault context data. Given on the one hand the expected savings in terms of ease and quality of repair, and on the other hand the constant and rapid decrease in the cost of EEPROM-type components, this multiplication is more than acceptable.

Compared to the prior solution consisting in recording the values of the parameters of the fault over a limited number of occurrences of the fault, implementing the method according to the invention makes it possible, on the one hand, to limit the size of the memory used to what is strictly necessary, and on the other hand to retain all the richness of the information stored during the use of the system. In practice, in the prior solution, the recording of the data was necessarily stopped after m detections of the failure (limitation due to the memory size). In the invention, however, the data is updated on each new occurrence of the fault, regardless of the number of occurrences of the fault, until it is repaired.

Finally, all the context data seen over all the occurrences of the fault (assuming unlimited nonvolatile memory resources) is of practically no benefit compared to the solution proposed by the invention.

Indeed, it would be reasonable to imagine that a repairer having all the context data for all the occurrences of the fault would immediately look for ranges of values (that is, the minimum value and the maximum value) of the parameters in which the fault occurs in order to determine the origin of the fault. Now, the method according to the invention immediately supplies these ranges of values, with no cost overhead. Indeed, the method according to the invention offers, at least in its most refined embodiment, both:

a precise "image" of the monitored device on the first detection of the fault, and a view of the operating zone in which the fault is reproduced.

The invention claimed is:

1. A method of recording information, implemented by a computer including a processor that is programmed with instructions that cause the computer to record information in a nonvolatile memory concerning an operating fault of a device in a motor vehicle, wherein the recorded information includes a minimum value and a maximum value of a parameter characteristic of an operation of the device in the motor vehicle, the method comprising:

an updating phase, performed when the operating fault of the device in the motor vehicle occurs, the updating phase including:

replacing the minimum value of the parameter with a current value of the parameter in the nonvolatile memory, if the current value of the parameter is less than the minimum value, and replacing the maximum value of the parameter with a current value of the parameter in the nonvolatile memory, if the current value is greater than the previously recorded maximum value.

2. The method as claimed in claim 1, further comprising an initialization phase, performed on a first occurrence of the operating fault which includes one or more of:

first initializing a reference value of the parameter with the current value of the parameter, second initializing the minimum value of the parameter and the maximum value of the parameter with the current value of the parameter, repeating the first initializing and/or the second initializing for each parameter characteristic of the device in operation, and initializing the number of occurrences.

3. The method as claimed in claim 2, wherein the recording information is directed to an operating fault of a drive train of the motor vehicle.

4. The method as claimed in claim 1, wherein the parameter is related to temperature.

5. The method as claimed in claim 1, wherein the parameter is speed of an engine of the motor vehicle.

6. The method as claimed in claim 1, wherein the information that is recorded includes a number of occurrences of the fault since a last time the nonvolatile memory was erased.

7. The method as claimed in claim 1, wherein the method diagnoses operation of a regulation device used to regulate the speed of a motor vehicle about a set point speed.

8. The method as claimed in claim 1, wherein the updating phase further comprises:

repeating the updating phase for each parameter characteristic of the device in operation.

9. The method as claimed in claim 1, wherein the updating phase further comprises:

incrementing a number of occurrences of the fault.

10. The method as claimed in claim 1, wherein the updating phase is repeated on each occurrence of the fault.

* * * * *